Sept. 13, 1949.   N. S. REYNOLDS   2,482,029
SEAL
Filed Aug. 5, 1946

INVENTOR.
Noel S. Reynolds
BY P. H. Lamphere
ATTORNEY

Patented Sept. 13, 1949

2,482,029

UNITED STATES PATENT OFFICE 2,482,029

SEAL

Noel S. Reynolds, St. Louis, Mo.

Application August 5, 1946, Serial No. 688,520

6 Claims. (Cl. 286—5)

This invention relates to seals and more particularly to seals for rotating members having annular surfaces. The invention is considered as an improvement in the seal structure disclosed by my prior Patent No. 2,358,536 issued September 19, 1944.

One of the objects of the invention is to produce an improved seal of the type embodying a sealing lip or ridge and an associated thrust ring which are attached for relative radial movement with respect to a member with which the seal is associated.

A further object is to so construct a seal of the type referred to that the thrust ring associated with the sealing lip will ride without tilting on the annular surface with which it is associated, notwithstanding that there may be eccentric relative movement between said annular surface and the member with which it has relative rotation.

Still a further object is to provide an improved arrangement of a web, a sealing lip and a thrust ring in a shaft seal and thereby obtain improved sealing characteristics.

Yet a further object is to provide in a seal improved means for embodying a thrust ring therein for association with a sealing lip or ridge.

Other objects of my invention will become apparent from the following description taken in connection with the accompanying drawings in which.

Figure 1:
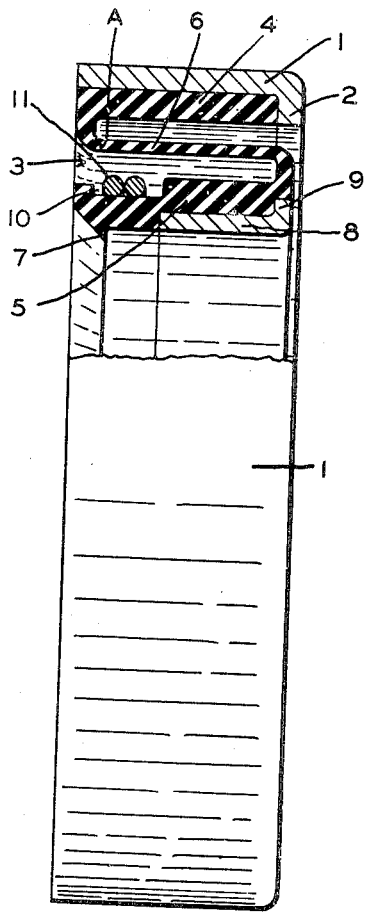
Figure 1 is a side view of a shaft seal embodying my invention, a portion of said seal being shown in radial section.

Referring first to Figure 1, there is disclosed a seal for employment between a rotating shaft and a fixed member, not shown, which can be a fixed housing surrounding the shaft. The seal has a rigid cylindrical outer member 1 provided with an inwardly extending flange 2 at one end. This outer member 1 is adapted to have a tight fit in the fixed member and is made of suitable rigid material such as metal. Moulded into the cylindrical member 1 is a member of flexible material generally indicated by the numeral 3. The moulded material can be natural rubber or a synthetic rubber like substance compounded to have desirable characteristics. The moulded member is composed of three integral portions, an outer cylindrical portion 4 of a thickness substantially the same as the flange 2, an inner cylindrical portion 5, and a flexible connecting web portion 6. All of these portions are radially arranged with respect to each other as shown.

The association and arrangement of these three portions of the member 3 is a very important feature of my invention. It is to be noted that the connecting web portion 6 is relatively thin and flexible and that it is cylindrical in shape with its axis coinciding with the axis of the seal. This cylindrical web portion has one end connected to the outer portion 4 and its other end connected to the inner portion 5. The connected ends are thus in axially spaced relations. The importance of this will become apparent.

The inner portion 5 of the moulded member 3 is of special cylindrical formation. On the end thereof remote from the end which is attached to web 6 is an inwardly extending sealing lip or ridge 7 of a V-shaped radial cross section. This lip or ridge is arranged to engage the shaft with which the seal is to be associated and provides the sealing action of the seal. The positioning of the lip or ridge on the end of the inner portion as shown results in said lip or ridge being substantially radially opposite of the connection of the web portion 6 with the outer portion 4.

The inner portion 5 of the moulded member 3 also carries a thrust bearing ring 8 which is non-expansible and preferably substantially rigid. Suitable material may be brass, bronze, copper, etc. This ring has an inner diameter to fit on the outer surface of the shaft with which the seal is to be associated and is free to ride on said shaft surface. During the moulding of the member 3 it is moulded and bonded directly to the ring and also to the member 1. The ring is positioned to extend from the end of the inner portion 5, which is connected to the web portion 6, toward the sealing lip or ridge. The bearing ring is preferably provided with an outer flange 9 as shown, to give rigidity to the end of the inner member 5 adjacent its connection with the web portion. The sealing lip or ridge 7 extends inwardly beyond the inner surface of the thrust bearing ring and the part of the inner portion 5 between the lip or ridge and the bearing ring is arranged to have the same inner diameter as the ring.

Figure 3:
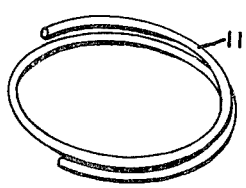
Figure 3 is a perspective view of a spring which may be embodied in the seal.

In order that the sealing lip or ridge may have the necessary sealing pressure engagement with the shaft it may be necessary to back up the lip or ridge with a spring means. To do this the outer surface of the inner portion 5 substantially radially of the lip or ridge is provided with an annular groove 10 and positioned in this groove is an annular wire spring 11 shown in perspective in Figure 3. The spring is so formed as to have substantially overlapping ends to thus provide substantially one and three-fourths coils. This spring, as positioned, will thus apply an inward radial force which will prevent the lip or ridge and the end of the inner portion 5 from flexing radially outwardly.

Figure 2:
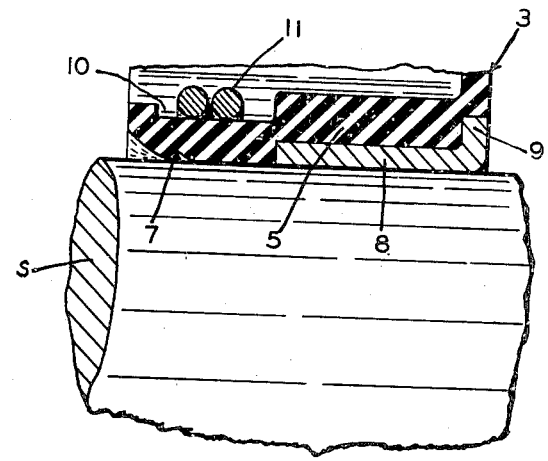
Figure 2 is an enlarged sectional view of a part of the seal showing it associated with a shaft.

When the seal just described in detail is positioned on a shaft, such as the shaft S shown in Figure 2, the relationship between the shaft and associated parts of the seal will be as shown. The thrust bearing ring will closely surround the shaft and ride on the shaft surface as said shaft rotates. The sealing lip or ridge, since it has a smaller internal diameter than the ring, will be flexed radially outwardly and the material thereof compressed in an outward radial direction. Consequently it will have pressure engagement with the shaft surface and produce a sealing action. The pressure engagement between the lip and the shaft surface will always be a substantially predetermined value as it is controlled by the thrust bearing ring. Any eccentric movement of the shaft in its bearing, and consequently any eccentric movement with respect to the outer cylindrical member of the seal, will not appreciably change the pressure relationship between the lip and the shaft surface. The ring 8 will ride on the shaft and since it is carried by the inner portion 5 of the member 3 and is closely associated with the lip or ridge, the ring will cause the lip to follow the eccentric movement without change in pressure engagement. If the pressure engagement of the lip with the shaft is sufficient without the use of the spring 11, then this spring may be eliminated. However, conditions may arise where this spring is necessary as, for example, when certain rubber compounds having desired wearing characteristics are employed and the resiliency of such compounds is not great enough to produce the desired sealing pressure between the lip or ridge and the shaft surface.

The efficient functioning of the seal is also enhanced by the particular construction and arrangement of the inner and outer portions, the web portions, the sealing lip and the thrust bearing ring. By the arrangement shown there will be no tilting of the thrust ring and pulling on the sealing lip when the shaft has any eccentric movement. When eccentric movement of the shaft takes place the web portion will always pivot about an axis which is at the end where it is connected to the supported outer portion 4 as generally indicated at A. During eccentric movement diametrical parts of the web will always move in unison about such points as A. Consequently, with the cylindrical form of the web and the relationship thereto of the sealing ring, the swinging movement of the opposite parts of the web about points A will result in corresponding opposite parts of the ring being pulled in the same axial direction and thus there will be no tilting of the ring. This eliminating of ring tilting, by eliminating opposed pulling on diametrically opposed sides of the lip or ridge, results in efficient sealing at all times and under all conditions. This efficient sealing is not always present in seals where the web portion is other than that of cylindrical shape as, for example, where the web is of conical construction as shown in my prior Patent No. 2,358,536, issued September 19, 1944. With such conical webs the eccentric movement of the thrust ring causes one side of the ring to be pulled axially in one direction and the diametrically opposite side of the ring to be pulled axially in the opposite direction. Consequently there will be some tilting of the ring and a change in sealing pressure at the lip on the side where the ring is being tilted away from the lip.

Figure 4:
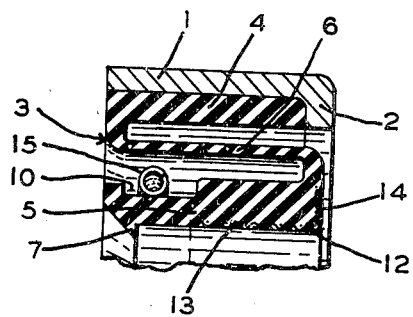
Figure 4 is a radial sectional view of a modified construction showing a different thrust ring construction.

In Figure 4 there is shown a slightly modified construction. The parts of this modified seal already described are indicated by the same reference characters. The general construction of the seal of Figure 4 is similar to that of Figure 1, differing, however, in the type of thrust bearing ring employed and the type of spring. In place of the full metal thrust bearing ring there can be employed an annular member 12 embedded in the inner portion 5. The member shown is a wire screen but other types of members can also be employed as, for example, an annular member having perforations or a woven fabric which has strands that are relatively non-stretchable. The wire screen shown has a cylindrical part 13 and a flange part 14, both embedded in the inner portion 5 of the molded member 3. The embedding is accomplished at the time of moulding.

The woven or perforated material has a slightly larger inner diameter than the shaft with which the seal is to be associated. Thus during moulding rubber compound will flow through the openings of the annular member and the result will be that the member is suspended in rubber and a very thin rubber wall is established between the annular member and the inner surface which is to engage the shaft. This rubber compound bearing surface backed by the annular non-stretchable member produces a good thrust bearing ring means so that the sealing lip or ridge sealing pressure will be properly maintained substantially constant during any eccentric movement of the shaft. Also the rubber bearing surface contacting the shaft will insure that shaft wear and shaft scoring will be very light. The woven or perforated material will cause the inner portion 5 of the seal to follow the eccentric movement during high rotative speeds of the shaft without any appreciable "out of round" condition being present. Consequently good sealing pressure at the lip will be substantially uniform. In place of the wire coil spring 11 the groove 10 can have placed therein a garter spring 15 to accomplish the same result in increasing, if necessary, the pressure engagement of the lip with the shaft. One type of spring is the full equivalent of the other insofar as function is concerned.

Figure 5:
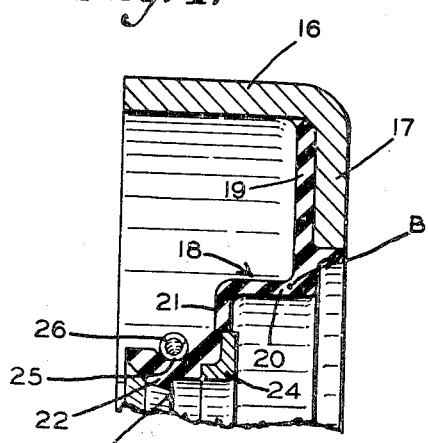
Figure 5 is a radial sectional view of another modified construction.

In Figure 5 there is shown another seal construction embodying the invention and having a slightly different form of flexible material. As shown, the seal has a rigid cylindrical outer member 16 provided with an inwardly extending flange 17 and which is arranged to be associated with a fixed housing surrounding the shaft. The cylindrical member 16 has moulded thereto the flexible member of rubber or synthetic rubber like material generally indicated by the numeral 18. This flexible member has four integral portions, namely, an outer portion 19 bonded to the inner surface of the flange 17, a cylindrical portion 20 extending axially from the portion 19 and inwardly with respect to the said portion 19, a radial portion 21 and an inner portion 22. The inner portion 22 has an integral sealing lip or ridge 23 which is V-shaped in radial cross section and is arranged to engage the shaft. The diameter at the apex of the sealing ridge is somewhat less than the diameter of the shaft to be engaged. Associated with the inner portion 22 and bonded thereto is a thrust bearing ring 24 having an inner diameter substantially the same as the diameter of the shaft. This ring is axially spaced from the sealing ridge as indicated so that when the seal is placed on the shaft the sealing ridge will be flexed in a radially outward direction and its engaging pressure maintained substantially constant by the trust bearing ring 24 in the same manner as the thrust bearing rings of the seals previously described. If desired, the inner portions 22 can be provided with a groove 25 in which can be received a spring 26, this spring being radially opposite the sealing lip or ridge.

When the seal is placed upon the shaft and there is any eccentric movement of the shaft with respect to the housing, the thrust bearing ring 24 will insure that the sealing lip or ridge will engage the shaft with a constant pressure in a manner already described with respect to the other seals. Due to the fact that the portion 20 of the flexible member 18 is cylindrical and at right angles to the fixed attached portion of the member comprising the portion 19 bonded to the flange 17, there will be no tilting of the sealing ring as the eccentric movement of the shaft takes place. The portion 20 will swing about the axis indicated at B and the pull on the ring will always be in the same axial direction on diametrically opposed sides of the shaft.

The thrust bearing ring 24 is shown as a solid ring directly engaging the shaft, but if desired this ring may have substituted therefor a woven screen or perforated ring and be embodied in the inner member 22 in the same manner as the screen or perforated member is embodied in the seal shown in Figure 4.

The seals shown, by way of example, are to be associated with rotating shafts but it is apparent that the parts can be reversed where it is desired to seal an inner cylindrical surface.

Being aware of the possibility of modifications in the particular seal structures shown and described without departing from the fundamental principles of my invention, I do not intend that the invention be limited in any manner except in accordance with the appended claims.

What is claimed is:

1. In a seal for association with two relatively rotatable members one of which is provided with a cylindrical surface, said seal comprising two portions one of which is provided with a yieldable sealing lip engaging the cylindrical surface and the other of which is associated with the other relatively rotatable member and a third cylindrical web portion connecting said two portions and having one end connected to the portion provided with the lip at a point remote from the lip and the other end connected to the other of the two portions at a point substantially radially of the lip, and means providing a non-expansible thrust bearing portion on the lip carrying portion adjacent its connection with the web for surrounding and riding on the cylindrical surface of the one relatively rotatable member, said sealing lip having such a normally formed diameter as to project radially beyond the thrust bearing portion so that when the seal is mounted for operation it will be flexed radially and have pressure engagement with the cylindrical surface.

2. In a seal for association with a shaft and comprising an axially extending portion surrounding the shaft and provided adjacent and inwardly of one end with a sealing ridge having a normal internal diameter less than the shaft, a second surrounding portion radially spaced from the first portion, a flexible cylindrical web portion having one end connected to the first portion at its end remote from the sealing ridge and its other end to the second portion, and a non-expansible thrust ring portion forming no part of sealing ridge and being associated with the first portion at its end remote from the ridge and which is connected to the web portion and being of a diameter substantially the same as the shaft so as to ride thereon and follow any eccentric movement of the shaft.

3. In a seal for association with a shaft and comprising an axially extending portion surrounding the shaft and provided adjacent one end with a sealing ridge having a normal internal diameter less than the shaft, a second surrounding portion radially spaced from the first portion, a flexible cylindrical web portion having one end connected to the first portion at its end remote from the sealing ridge and its other end to the second portion substantially radially of the sealing ridge, a non-expansible thrust ring portion forming no part of the sealing ridge and being associated with the first portion at its end remote from the ridge and which is connected to the web portion and being of a diameter substantially the same as the shaft so as to ride thereon and follow any eccentric movement of the shaft, and means surrounding the first portion substantially radially opposite the ridge for applying a yieldable pressure to the ridge in a radial direction toward the shaft.

4. In a seal for association with a shaft and comprising an annular outer member, an annular axially extending inner member of yieldable material provided adjacent one end with a sealing lip having a slightly smaller normal inner diameter than the shaft surface diameter, said inner member also being provided with an integral web portion connecting its end remote from the sealing lip with the outer member at a point substantially radially opposite the lip, said web portion between the inner portion and the outer portion being of cylindrical shape and substantially concentric with the shaft surface, and an annular non-expansible thrust bearing member carried by the inner member adjacent the end connected to the web and being of an internal diameter substantially that of the shaft surface.

5. In a seal for association with a shaft and comprising an annular outer member, an annular axially extending inner member of yieldable material provided adjacent one end with a sealing lip having a slightly smaller normal inner diameter than the shaft surface diameter, said inner member also being provided with an integral web portion connecting its end remote from the sealing lip with the outer member at a point substantially radially opposite the lip, said web portion between the inner portion and the outer portion being of cylindrical shape and substantially concentric with the shaft surface, and an annular member of woven non-stretchable material embedded in the inner member adjacent its end connected to the web and being so related to the inner surface of said member as to provide a substantially non-expansible annular thrust bearing for riding on the shaft and causing the inner member and the lip to follow any eccentric movement of the shaft.

6. In a seal for association with a shaft and comprising an outer portion for mounting on a fixed member, yielding means providing a sealing lip of V-shaped cross section inwardly of one end for yieldably engaging the shaft surface by its apex, a flexible web connecting the sealing lip means with the outer portion, said web comprising a cylindrical portion spaced from the outer portion and also the yieldable means providing the sealing lip and of considerable axial length and being connected at one end to the outer portion and at the other end to the sealing lip means at a distance axially from the apex of the V-shaped lip, and means providing a non-expansible thrust bearing portion for riding on the shaft surface, said bearing being axially spaced from the apex of the V-shaped lip and with at least a part thereof radially opposite the end of the web which is connected to said sealing lip means.

NOEL S. REYNOLDS.

REFERENCES CITED

The following references are of record in the file of this patent:

UNITED STATES PATENTS

| Number | Name | Date |
| --- | --- | --- |
| 1,869,021 | Perks | July 26, 1932 |
| 2,181,203 | Reynolds | Nov. 28, 1939 |
| 2,213,116 | Bernstein | Aug. 27, 1940 |
| 2,358,536 | Reynolds | Sept. 19, 1944 |
| 2,394,012 | Rayburn | Feb. 5, 1946 |